US007673283B2

(12) United States Patent
Gutz et al.

(10) Patent No.: US 7,673,283 B2
(45) Date of Patent: Mar. 2, 2010

(54) METHOD AND SYSTEM FOR IMPROVED MODELING LANGUAGE PROFILE

(75) Inventors: Steve John Gutz, Gloucester (CA); Kenneth Earle Hussey, Kanata (CA); Daniel Donat Leroux, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 10/965,272

(22) Filed: Oct. 14, 2004

(65) Prior Publication Data

US 2006/0101376 A1   May 11, 2006

(51) Int. Cl.
*G06F 9/44* (2006.01)
(52) U.S. Cl. ....................................... 717/104
(58) Field of Classification Search ................. 717/104, 717/105
See application file for complete search history.

(56) References Cited

U.S. PATENT DOCUMENTS

| | | | |
|---|---|---|---|
| 5,987,247 A | 11/1999 | Lau | |
| 6,356,955 B1 | 3/2002 | Hollberg et al. | |
| 6,611,955 B1 | 8/2003 | Logean et al. | |
| 7,039,908 B2 | 5/2006 | Steensgaard | |
| 7,069,537 B2 | 6/2006 | Lazarov | |
| 7,219,328 B2* | 5/2007 | Schloegel et al. | 717/104 |
| 7,293,254 B2* | 11/2007 | Bloesch et al. | 717/108 |
| 7,414,176 B2 | 7/2008 | Reeder et al. | |
| 2002/0104068 A1* | 8/2002 | Barrett et al. | 717/104 |
| 2002/0147763 A1 | 10/2002 | Lee et al. | |
| 2004/0139095 A1 | 7/2004 | Trastour et al. | |
| 2005/0071805 A1* | 3/2005 | Lauterbach et al. | 717/104 |
| 2005/0076328 A1 | 4/2005 | Berenbach et al. | |
| 2005/0160401 A1* | 7/2005 | Russo et al. | 717/108 |
| 2005/0188353 A1 | 8/2005 | Hasson et al. | |
| 2005/0261923 A1 | 11/2005 | Brown et al. | |
| 2005/0268281 A1 | 12/2005 | Letkeman et al. | |
| 2006/0064667 A1 | 3/2006 | de Freitas | |
| 2006/0101376 A1 | 5/2006 | Gutz et al. | |

FOREIGN PATENT DOCUMENTS

JP  2001075817  3/2001

OTHER PUBLICATIONS

Alhir, "Extending the Unified Modeling Language", 1999, retrieved from: http://citeseer.ist.psu.edu/alhir99extending.html.*
Gogolla et al., "Analysis of UML Stereotypes with the UML Metamodel", 2002, UML 2002, LNCS 2460, pp. 84-99.*
Budinsky et al., "Eclipse Modeling Framework: A Developer's Guide", Aug. 2003, Addison Wesley Professional, Sections: 5.7, 13.6.*

(Continued)

*Primary Examiner*—Lewis A Bullock, Jr.
*Assistant Examiner*—Jue Wang
(74) *Attorney, Agent, or Firm*—Hamilton, Brook, Smith & Reynolds, P.C.

(57) ABSTRACT

Computer method and system improves implementation of modeling language profiles. The invention method and system enables user definition of an extension and application of the defined extension to a model element. During runtime, a metamodel object is dynamically created for representing the defined extension, and a link is dynamically generated. The link provides a reference between the metamodel object and the model element.

13 Claims, 7 Drawing Sheets

Stereotype Applied to a Class

OTHER PUBLICATIONS

Budinsky et al., "Ecplise Modeling Framework: A Developer's Guide", Aug. 2003, Addison Wesley Professional, Sections: 5..5, 8.2.*

Budinsky, F. et al., "Dynamic EMF," *Eclipse Modeling Framework—A Developer's Guide*, Addison-Wesley 2004, pp. 34-35.

Merks, E., "The Eclipse Modeling Framework: Introducing Modeling to the Java™ Technology Mainstream," *JavaOne Sun's 2004 Worldwide Java Developer Conference*, slides 1-37 (2004).

OMG Document, "UML 2.0 Infrastructure Specification," Sep. 2003, Object Management Group, Inc., pp. 1-187.

"Unified Modeling Language: Superstructure," Version 2.0, Final Adopted Specification, pp. 569-584 (2003).

Robak, S. et al., "Extending the UML for Modelling Variability for System Families," *Int. J. Appl. Math. Comput. Sci.*, 12(2): 285-298 (2002).

Szostak, S. et al., "UML Extensions for Modeling Real-Time and Embedded Systems," *The International Workshop on Discrete-Event System Design*, DESDcs '01, Przytok, Poland, pp. 1-6 (Jun. 27-29, 2001).

D'Souza, D. et al., "First Class Extensibility for UML—Packaging of Profiles, Stereotypes, Patterns," In *UML '99—The Unified Modeling Language—Beyond the Standard*, Second International Conference, Fort Collins, Colorado, pp. 265-277 (Oct. 28-30, 1999).

Perez-Martinez, J.E., "Heavyweight extensions to the UML metamodel to describe the C3 architectural style," ACM SIGSOFT Software Engineering Notes, 28(3): 1-6, ACM Press (May 2003).

Selonen, P. and Xu, J., "Validating UML Models Against Architectural Profiles," *Proceedings of 9$^{th}$ European Software Engineering Conference/11$^{th}$ ACM SIGSOFT International Symposium on Foundations of Software Engineering '03*, Helsinki (ACM SIGSOFT Software Engineering Notes) 28(5): 58-67 (Sept. 1-5, 2003).

de Miguel, M. et al., "UML Extensions for the Specification and Evaluation of Latency Constraints in Architectural Models," *Proceedings of the Second International Workshop on Software and Performance* (ACM Press), Ottawa, Ontario, Canada, pp. 83-88 (2000).

Cortellessa, V. and Pompei, A., "Towards a UML profile for QoS: a contribution in the reliability domain," *Proceedings of the Fourth International Workshop on Software and Performance*, Redwood Shores, California (ACM SIGSOFT Software Engineering Notes) 29(1): 197-206 (Jan. 14-16, 2004).

Büttner, F. and Gogolla, M., "On Generalization and Overriding in UML 2.0," *OCL and Model Driven Engineering, UML 2004 Conference Workshop*, pp. 1-15 (2004).

Akehurst, et al., "Implementing Associations: UML 2.0 to Java 5," *Software and Systems Modeling*, 6(1):3-35 (2007).

OMG Document, "Unified Modeling Language: Superstructure," Aug. 2003, Object Management Group, Inc., Version 2.0, pp. 1-609.

* cited by examiner

Typical UML2 Metaclass Extention

FIG. 1

FIG. 2
Metaclass Extension in Detail

FIG. 3
An Applied Stereotype

METHOD AND SYSTEM FOR IMPROVED MODELING LANGUAGE PROFILE

BACKGROUND OF THE INVENTION

With the proliferation of software products and services, attempts have been made to codify and/or standardize the designing of software and software architecture. Examples include:

The Booch Method and Modeling Language (see "Object Oriented Analysis and Design" by Grady Booch);

James Rumbaugh and associates' Object Modeling Technique (OMT);

the Object Oriented Software Engineering (OOSE) method by Ivar Jacobson; and the Unified Modeling Language (UML) which combines the foregoing and industry best practices.

The UML is a visual modeling language (with formal syntax and semantics) for communicating a model or conceptionalization. Thus the modeling language specification specifies modeling elements, notation and usage guidelines and not order of activities, specification of artifacts, repository interface, storage, run-time behavior and so forth. In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

In one example, UML2 profiles provide a mechanism that allows metaclasses from an existing metamodel to be extended in order to adapt them for different purposes. For instance, the UML2 metamodel can be tailored to different platforms, such as J2EE or the .NET framework.

However, the UML2 specification for profiles and stereotypes, while technically complete, offers little guidance with regard to implementation. As it happens, implementing support for UML2 profiles using the Java language and a metamodeling framework such as the Eclipse Modeling Framework (EMF) is not trivial. There are two basic questions that arise within the problem domain:

1. How are profiles created? (Refers to the syntax of the solution)

2. How are stereotypes applied to a model? (Refers to the semantics of the solution)

One solution to the problem is to actually represent stereotype application completely using M1 (See Table 1) concepts, which has been used in the past; however, this technique suffers from a number of limitations:

1. There are issues of scalability. This technique requires many additional object creations at run-time because access to stereotype properties requires creation of instance specification objects 2. Properties are bound to standard UML2 types. There is no provision to support language-specific types such as standard Java types.

3. It requires meta-level mixing (M2 concepts defined using M1 objects), which may be confusing to tool developers attempting to use the metamodel.

4. Model eventing limitations. Since the stereotype is defined using pure UML concepts, it requires one to listen for data change at several different points in the model (e.g. property, slot, instance value).

A second solution to the problem is to employ statically generated metaclasses based on the profile's stereotype extensions. The most significant problem with this approach is the requirement to generate code and compile it in order to provide the extension. If a stereotype is modified the code must be regenerated and reapplied to the model. Additionally it is possible to create incompatible schemes if multiple users generate the static metaclass extensions using different techniques or different profile versions. This results in model incompatibility.

SUMMARY OF THE INVENTION

The present invention provides a computer method and system of extending metaclasses in a metamodel. The invention method includes the steps of (a) defining an extension, (b) applying the defined extension to a model element, and (c) during run time, dynamically creating a metamodel object representing the defined extension and dynamically linking the created metamodel object to the model element.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

To solve the problems cited above, applicants have devised a mechanism which employs dynamic EMF (Eclipse Modeling Framework) to create the stereotype metaclass extensions at run-time. This avoids the scalability concerns and other limitations of the first solution described above, and because the process occurs dynamically, it does not require the static code generation noted in the second solution above. In a preferred embodiment, the invention mechanism is implemented in JAVA.

Advantages to the present invention approach include:

1. Because dynamic EMF is used, there is no need for intermediate code generation to extend the metamodel. The ECore representation (i.e., metadata for UML2 meta model including classes and associations, etc.) can be created at run-time.

2. There are fewer object creations so this approach is much more scalable. The stereotype application is represented as a single ECore EObject (i.e., instance of the ECore EClass) within an annotation on the element to which it has been applied.

3. It does not rely on UML2 slots to hold stereotype data, so this approach can support extended primitive data types such as those offered in the standard Java language (e.g. float, double, long, char, byte)

4. Since the stereotype application is represented as an EObject, adding standard eventing to the model is easier. With this approach there is only a single element to attach to rather than trying to listen for data change events in the class property, a slot, and an instance value object.

A description of preferred embodiments of the invention follows.

The modeling architecture for UML2 can be viewed using a four layer metamodel hierarchy. These layers provide for the meta-metamodel (e.g. infrastructure library), the meta-model (UML2), the user model (the model defined in the user's problem domain), and the application layer (the layer of user code that exploits the model they have defined). For reference, the following diagram outlines the four level meta-model hierarchy, including a description of each level and an example of the information found at each level:

TABLE 1

Four-Level Metamodel Hierarchy

| Level | Description | Examples |
|---|---|---|
| M3 | Meta-metamodel Applicants solution uses ECore but there are other frameworks as well. The model used to define meta-models Forms the foundation of the metamodeling hierarchy providing the basic work units for the meta model. | Instances of ECore EPackage, EClass, EAttribute, EReference |
| M2 | UML 2 meta-model Every element in the meta-model is an instance of an element in the meta-metamodel. Defines a language for specifying models | Instances of ECore Package, Class, Property, Association |
| M1 | User model An instance of the metamodel. allows users to define their problem domain | Instances of UML2 elements MyClass, Date, etc. |
| M0 | Run-time instances contains run-time instances of model elements | Instances of User model myClass, date, etc. |

Figure 1:
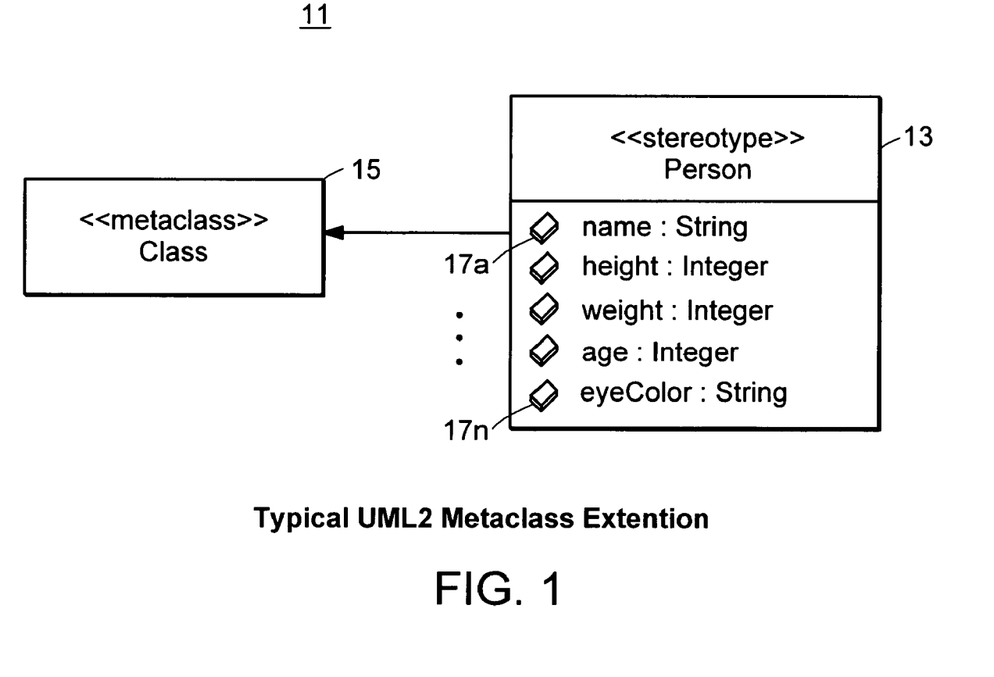
FIG. 1 is a schematic illustration of UML2 metaclass extension.

In general, a UML "profile" is a collection of stereotypes. A stereotype is a type of class (in the object oriented programming sense) and has zero or more properties. A typical example UML2 profile contains a stereotype that extends a metaclass. Illustrated in FIG. 1 is an example Profile 11 consisting of a stereotype extension 13 to the UML2 metaclass "Class" 15. The illustrated stereotype "Person" 13 adds new properties "name", "height", "weight", "age", and "eye color" (generally 17) to the metaclass "Class" 15.

Figure 2:
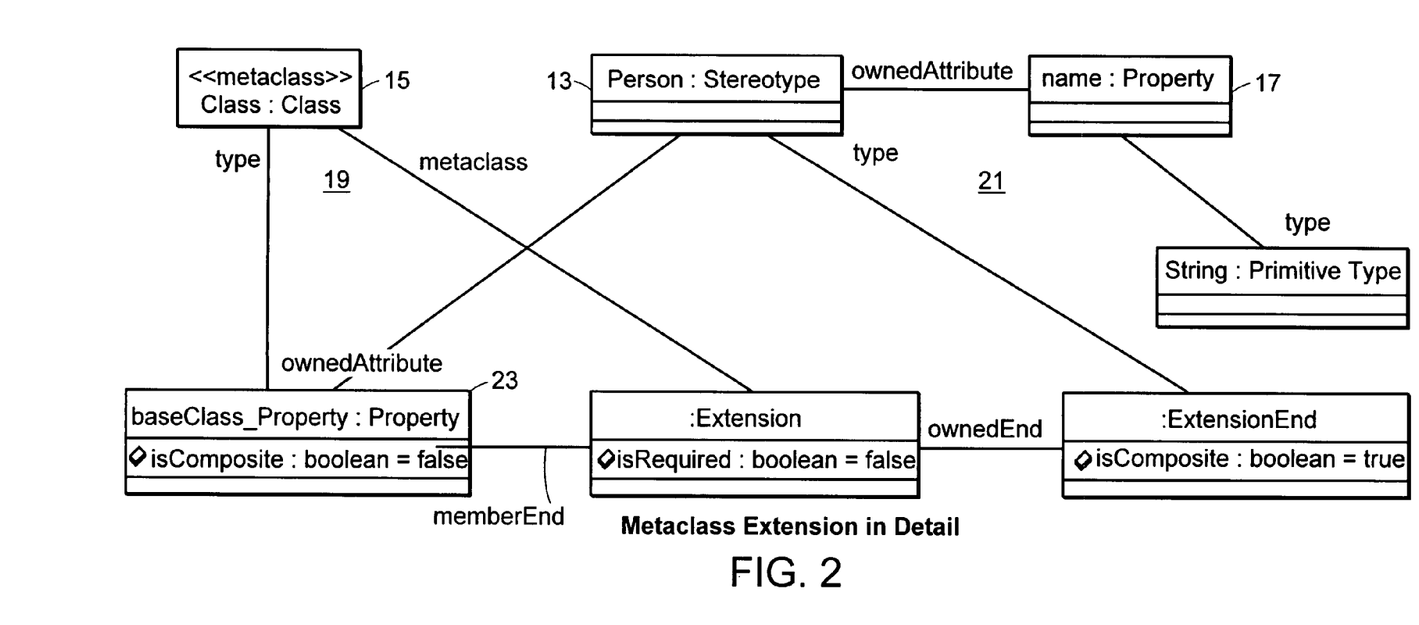
FIG. 2 is a block diagram of the UML2 detailed model for the example of FIG. 1.

In terms of how the UML2 models this example, the diagram shown in FIG. 2 details the semantic structure of the stereotype definition. Note that a "trick" is used at 19 to bridge the metamodel gap, whereby a class (at 15) with the name of the metatype being extended is used and stereotyped as a metaclass. Stereotype 13 is diagrammed as an extension 21 and as having property attributes 17 and 23. To simplify the diagram only one of the five properties 17 (i.e., "name") of the stereotype 13 is shown. Although the stereotype 13 is at the M1 level (see Table 1), it is diagrammed as extending M2 classes. Thus, a mechanism is needed to manage and keep track of applied stereotypes 13.

Figure 3:
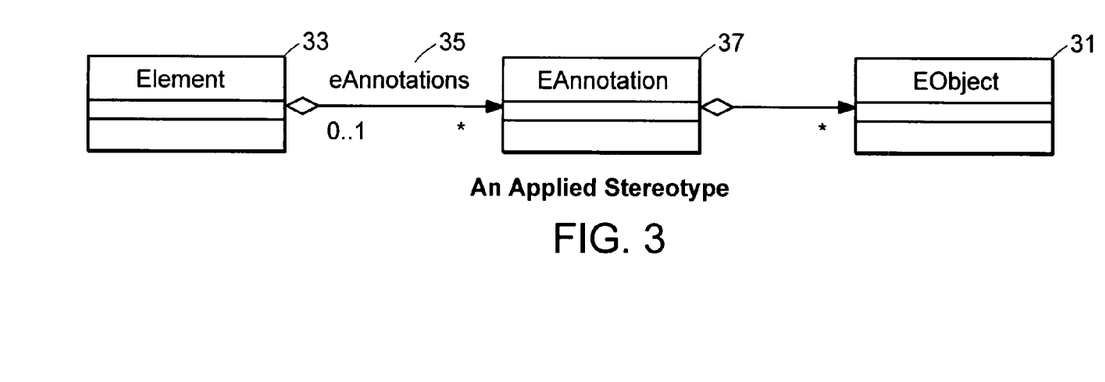
FIG. 3 is a block diagram of application of the extension of FIG. 1 according to the principles of the present invention.
Figure 4:
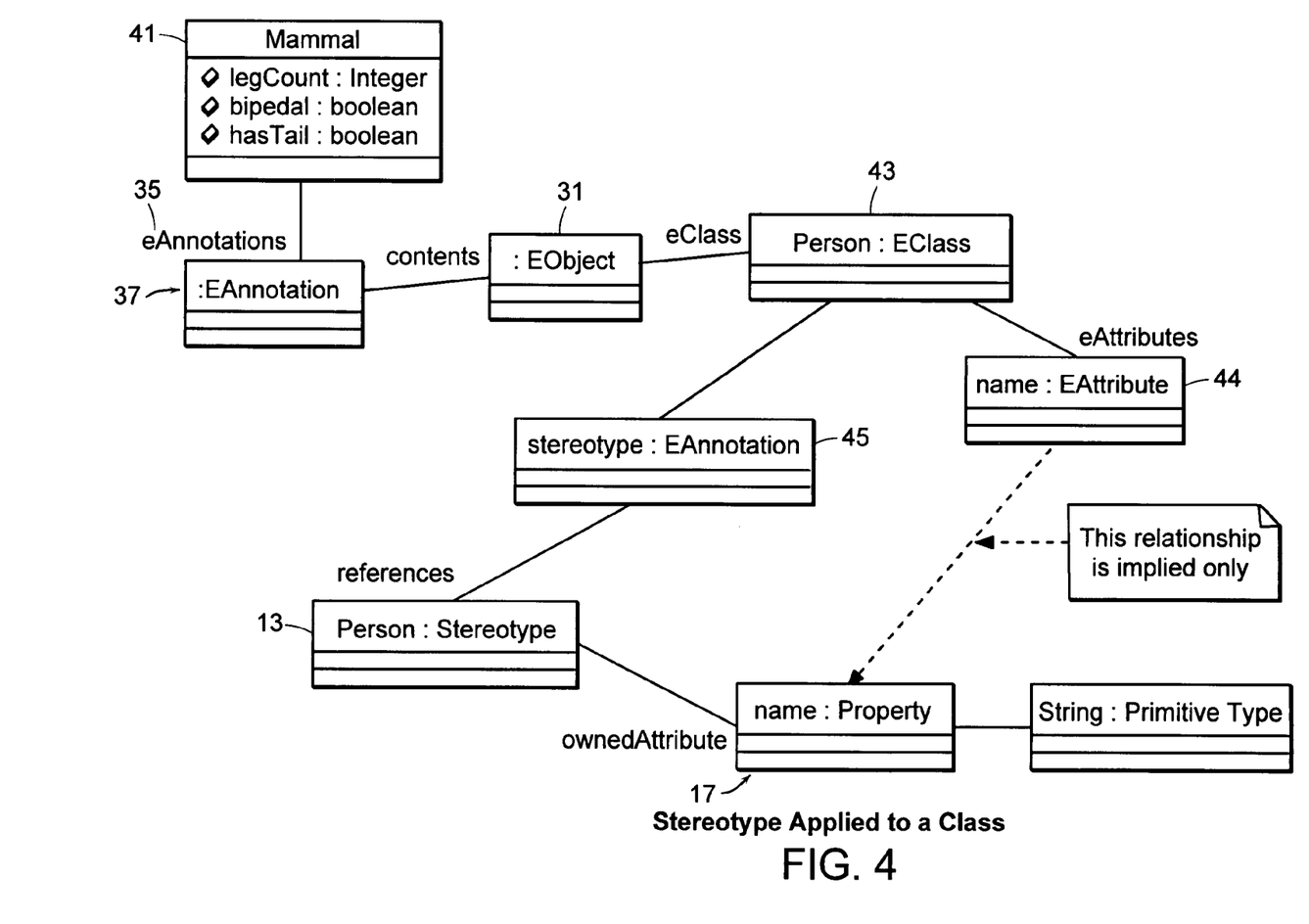
FIG. 4 is a block diagram showing the use of the present invention to stereotype a class "Mammal" with a stereotype "Person".

In the preferred embodiment, when the stereotype 13 is applied to a model element, it is accomplished with the aid of EMF dynamic extensions as shown in FIGS. 3 and 4. This involves creating an EObject instance 31 of a dynamically created EClass representing the extended metatype and adding the created EObject instance 31 as an annotation 35 in the element's 33 list of annotations 37 (applied stereotypes). Fields added to the Element 33 via the stereotype 13 can be accessed using EMF's dynamic APIs such as eGet( ) and eSet( ).

FIG. 4 shows the semantic structure used to apply the stereotype named "Person" 13 to a class named "Mammal" 41 (or generically a model element) using the present invention. Recall that stereotype 13 is an extension of the metaclass "Class" 15 of FIG. 1. A corresponding EClass 43 is dynamically created and represents the applied stereotype (stereotype extension) 13. An EObject instance 31 of the EClass 43 is created and added as an annotation 35 in the list 37 of annotations of the Mammal element 41. This effectively creates an annotation reference to the meta-metamodel (EPackage) of the Mammal element 41.

The properties 17 added by the stereotype extension 13 are represented by added element fields such as EAttribute 44. There is an implied relationship between the added element fields 44 and the properties 17 of the applied stereotype 13.

Lastly, an EAnnotation 45 is attached to the EClass 43 to retain a reference to the stereotype 13 that has been applied. EAnnotation 45 effectively serves as a link between the EObject instance 31 and applied stereotype extension 13.

Figure 5:
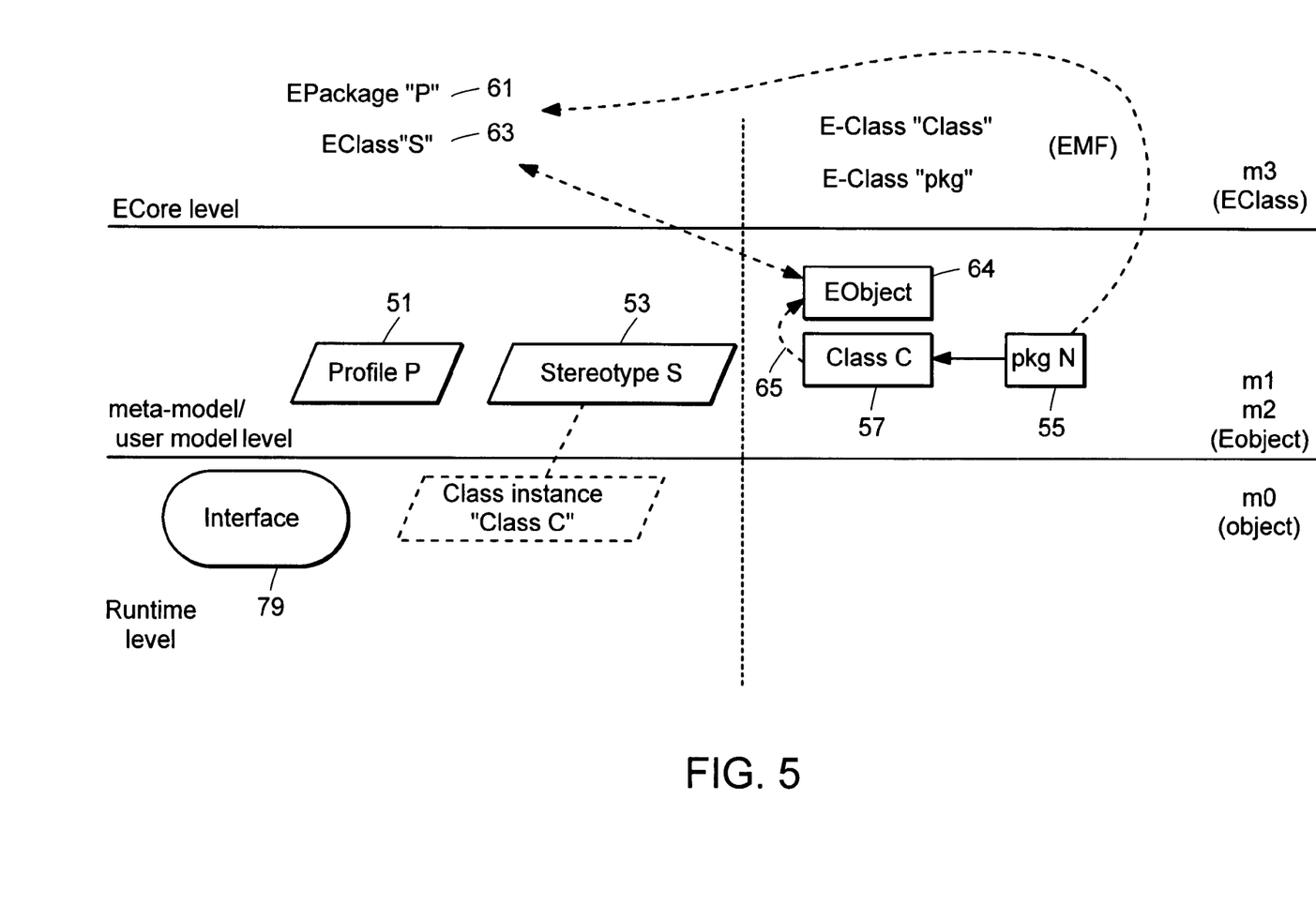
FIG. 5 is a schematic illustration of another embodiment of the present invention.

FIG. 5 further illustrates the preferred embodiment of the present invention. Recalling the levels of abstraction from Table 1, FIG. 5. shows the highest level of abstraction metadata (i.e., metamodel data of the metamodels in the next lower level of abstraction) at a top layer referred to as the ECore level (M3). A middle layer (M1/M2) shows representations of the metamodels and user model elements. A bottom layer (M0) illustrates runtime elements.

Profile 51 contains one or more stereotypes 53 of which stereotype S is exemplary. Stereotype S 53 is similar to the above-discussed stereotype 13. For purposes of illustration, say stereotype S 53 declares an extension to metaclass "Class C". Profile 51 and the model 55 to which it will be applied are loaded at the metamodel/user model level. Then an EPackage and corresponding EClass instances are created at the ECore level to contain an EMF rendition of each stereotype 53 from the profile 51. This is illustrated as instance EPackage "P" 61 corresponding to profile 51 and instance EClass "S" 63 corresponding to Stereotype S 53. Model 55 holds a plurality of profile objects. Each profile object points to or references a respective version of a profile 51.

Where "Class C" is stereotyped by Stereotype S53, a given class "Class C" 57 is loaded from the model 55 and the Stereotype S 53 is applied to it. This is accomplished through references to corresponding EPackage P 61 and EClass S 63 of the ECore meta-metamodel and a created (at runtime) EObject 64 which serves as a metamodel instance of EClass S 63 corresponding to subject stereotypes S 53. A link 65 (also created at runtime) between given class Class C 57 and EObject 64 enables the class to which a stereotype 53 has been applied to reference the corresponding EClass S 63 instance (i.e., EObject 64). Also shown at the ECore level are corresponding EMF renditions of the Class 57 (illustrated as EClass "Class") and subject model 55 (at EClass "Package"). Lastly, the value of the resolution field in the stereotype 53 is changed from its default value to some arbitrary value and the updated model 55 is stored.

The following code is exemplary and illustrates the present invention interface 79 (including use of the EMF API) to the metamodel level (M1/M2). Note, the calls to "getprofile( )" and "getModel( )" methods simply load the respective models from a resource set using the file names specified. The EPackage "myProfilePackage" is used to manage the Ecore representation of the profile 51 and all EClasses relating to Stereotypes 53 contained within.

```
// Get the profile
Profile myProfile = getProfile ( resourceSet, "profile.uml2");
Model myModel = getModel ( resourceSet, "model.uml2");
// Create an ecore package for the profile
EPackage myProfilePackage =
(EPackage)EcoreFactory.eINSTANCE.createEPackage ( );
    myProfilePackage.setName ( myProfile.getName( ) );
    myProfilePackage.setNsPrefix ( "profile");
    myProfilePackage.setNsURI ("http://profile") ;
// Iterate through each stereotype in the profile and add it
to the ecore
// equivalent
for( Iterator it = myProfile.getOwnedStereotype( ).iterator( );
it.hasNext( ); ) {
    defineStereotype( myProfilePackage, (Stereotype)obj );
}
// Get the Class C class and apply stereotype S to it
org.eclipse.uml2.Class myClass = getClass ( myModel, "Class C");
myClass.eAdapters( ). add( StereotypeTestAdapter.INSTANCE );
applyStereotype ( myClass, myProfilePackage, "S") ;
// Set some values in the additional fields
setStereotypeData( myClass, "S", "resolution", new Integer(
118 ) );
// Save a new resources to disk
saveResource( resourceSet, "model.uml2", myModel,
    myProfilePackage );
```

Note the line that adds an instance of the StereotypTestAdapter to the Class eAdapter collection. The purpose of this will be described below.

Defining a Stereotype

To define a stereotype 53 using the EMF technique, a corresponding EClass 63 is created with a name matching the stereotype 53 ("S" in the illustrated example), and the class is added to an EPackage 61 representing the profile 51. For each property in the stereotype 53, an EAttribute or EReference (like 44 in FIG. 4) is created, populated with the property information, and added to the EClass 63.

```
private void defineStereotype ( EPackage myProfilePackage,
    Stereotype st )
{
// Create an ecore class for this stereotype and add it to
the package
EClass stClass = EcoreFactory.eINSTANCE.createEClass( );
stClass.setName ( st.getName( ) );
myProfilePackage.getEClassifiers( ).add( stClass );
// Copy stereotype properties into ecore attributes
for( Iterator it = st.getOwnedAttribute( ).iterator( );
it.hasNext( ); ) {
    Property prop = (Property)it.next( );
    if(prop.getAssociation( ) = = null && prop.getType( )
    instanceof PrimitiveType){
    // Create an ecore eAttribute for this property
    EAttribute ecoreAttr =
    EcoreFactory.eINSTANCE.createEAttribute( );
    ecoreAttr.setName( prop.getName( ) );
    ecoreAttr.setDefaultValueLiteral(
    prop.getDefaultValue( ).stringVlaue( ) );
    // Assign the correct ecore data type to the attribute.
    This Method sets the
    // EClassifier for the attribute based on the name of the
    property primitive type.
    createEClassifierFromPrimitiveType(ecoreAttr,
(PrimitiveType)prop.getType( ));
    stClass.getEAttributes( ) .add( ecoreAttr );
    }
  }
}
```

Applying a Stereotype

Applying the stereotype 53 to the class 57 involves creating an EMF instance (EObject 64) of the stereotype's EClass representation 63 and adding it to the list of applied stereotypes for the specified UML2 class (like at 35, 37 in FIG. 4):

```
private void applyStereotype( org.eclipse.uml2.Class myClass,
            EPackage myProfilePackage, String stName )
{
    // Get the stereotype being applied and create an ecore
    instance of it
    EClass stClass = (EClass) stereotypes.get ( stName );
    EObject stObject =
myProfilePackage.getEFactoryInstance( ).create(stClass);
    stObject.eAdapters( ).add( StereotypeTestAdapter.INSTANCE );
    // Add it to the model class's 57 list of applied stereotypes
    myClass.getAppliedStereotype( ).add( stObject ) ;
}
/**
 * This helper method retrieves the ecore instance of the named
 stereotype
 * for the specified UML2 class
 */
private EObject getStereotypeInstance ( org.eclipse.uml2.Class
    myClass, String
st Name )
{
for( Iterator it = myClass.getAppliedStereotype( ).iterator( );
it.hasNext( ); )
{
    EObject stObject = (EObject) it.next ( );
    if( stObject.eClass( ).getName( ).equals( stName ) )
        return stObject;
}
return null;
}
```

Note the line that adds an instance of the StereotypeTestAdapter to the EObject 64. The purpose of this will be described below.

Getting a Stereotype Value

The values of stereotype fields can be retrieved using code similar to the following:

```
private Object getStereotypeData( org.eclipse.uml2.Class myClass,
        String stName, String attrName, Object dataValue )
{
    // set some values in the in the additional fields
    EObject stObject = getStereotypeInstance( myClass, stName );
    EClass stClass = stObject.eClass( );
    EStructuralFeature = stClass.getEstructuralFeatuer ( attrName );
    return stObject.eGet ( feature ) ;
}
```

Setting a Stereotype Value

The values of stereotype fields within the UML2 class can be changed using code similar to the following:

```
private void setStereotypeData ( org.eclipse.uml2.Class
        myClass, String
stName, String attrName, Object dataValue)
```

```
{
    // Set some values in the additional fields
    EObject stObject = getstereotypeInstance( myClass,
    stName );
    EClass stClass = stObject.eClass( );
    EStructuralFeatuer feature = stClass.getEstructuralFeature
    ( attrName);
    stObject.eSet( feature, dataValue );
}
```

Event Management

In order to manage event listeners need only be attached on two places (i.e. the Class 57 and the EObject 64). An adapter class can be created (see the following code) to listen for model 55 changes. In this example, a singleton adapter prints messages when events occur. The adapter executes when a stereotype 53 is applied or when the value of a stereotype field changes (noting a distinction between changes from the default property value and regular data changes).

```
public class StereotypeTeastAdapter
        extends AdapterImpl
{
    public void notifyChanged( Notification notification )
    {
        System.out.println( "Notification:" + notification.getNotifier( ) ) ;
        if (notification.getNotifier( ) instanceof org.eclipse.uml2.Class ) {
            Class notificationClass + (Class)notification.getNotifier( );
            if( notification.getFeatuerID( notificationClass.getClass( ) )
    = =Uml2PackageImpl.ELEMENT__APPLIED__STEREOTYPE) {
                System.out.println( "Stereotype Applied to:"
    + notificationClass.getName ( ) );
            }
        }
    else if ( notification.getNotifier( ) instanceof EObject ) {
        EObject notificationObject = (EObject) notification.getNotifier ( ) ;
        EAttribute attr = (EAttribute)notification.getFeature( );
        //If no default value before, then just say the value changed
        if (attr.getDefaultValue ( ) = = null ) {
            System.out.println ( notificationObject.eClass( ).getName ( )+ '::' +
            attr.getname( ) + " changed from:" +
            notification.getOldStringValue( ) + " to:" +
            notification.getNewStringValue ( ) );
        }
        // Is it changing from the default?
        else if( notification.getOldStringValue( ).equals (
            attr.getDefaultValue( ).toString( ) ) ) {
    System.out.println(notificationObject.eClass( ).getName( )
    + "::" + attr.getName ( )
    + " changed from default value to: "
    + notification.getNewStringVlaue( ) ) ;
        }
    // Is it just changing Values?
        else if ( !notification.getOldStringValue( ).equals(
            notficiation.getNewStringValue( ) ) ) {
    System.out.println( notificationObject.eClass( ).getName( )
    + "::" + attr.getName ( ) + " changed from: "
    + notification.getOldStringValue ( )
    + " to: " + notification.getNewStringValue ( ) ) ;
        }
    }
    else {
        System.out.println ( "Unhandled notification:" +
notification.getNotifier( ) );
        }
    }
    public static StereotypeTestAdapter INSTANCE = New
StereotypeTestAdapter( );
}
```

To use this adapter, the application code must apply the adapter instance on the EClass 63 (to listen for stereotype applications) for the stereotype 53 as well as on the EOject instance 64 (to listen for property changes).

According to the foregoing, the present invention provides an interface (API) 79 to a metamodel that allows the user to create and define profiles 51 and corresponding stereotypes 53. Using EMF, a corresponding representation and interpretation of the user defined profiles and stereotypes at a higher level of abstraction (ECore level) is enabled. Further the present invention enables one to annotate subject EMF elements with arbitrary references to other metamodel objects. Although the above examples and illustrations show use of EMF EAttribute or the ECore level to create such references, other implementations (e.g., scripts, object reference, etc.) are suitable.

Where the present invention enables one to create any number of EObjects 64 with a direct reference (link 65) to a subject class 57, the scalability issues of the prior art are overcome. The present invention EObjects 64 (serving as an instance of the ECore representation of the subject stereotypes 53) and corresponding class links 65 remove the need to have a reference directly (or stepwise) to the stereotype 53.

Further, when a value of a subject class 57 changes, then each corresponding EObject 64 needs updating. With the present invention direct link 65 maintenance of EObjects 64 is unencumbered and straighforward.

Figure 6:
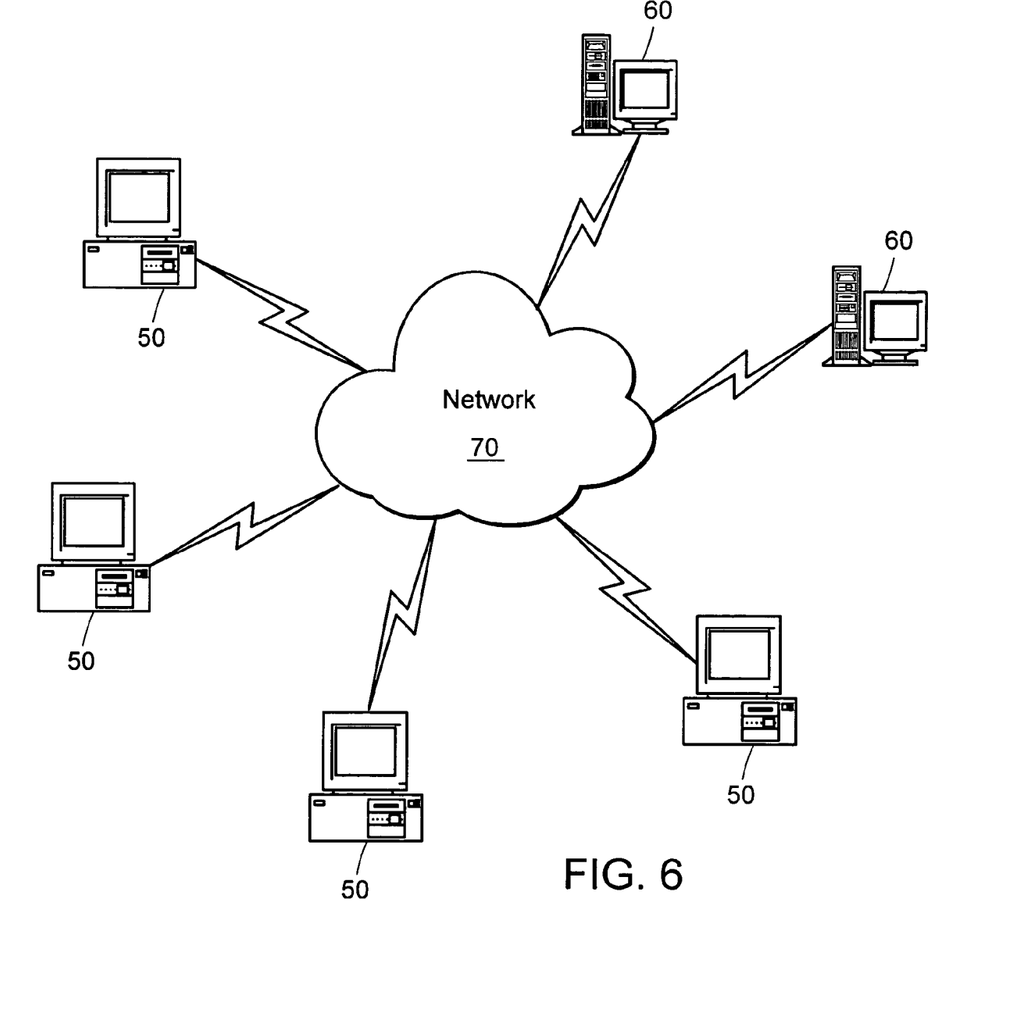
FIG. 6 is a schematic view of a computer environment in which the principles of the present invention may be implemented.

FIG. 6 illustrates an example computer environment in which the present invention operates. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the methods are implemented on a stand-alone computer. In either network or standalone, the invention output software design and models are sharable and reusable among users.

Figure 7:
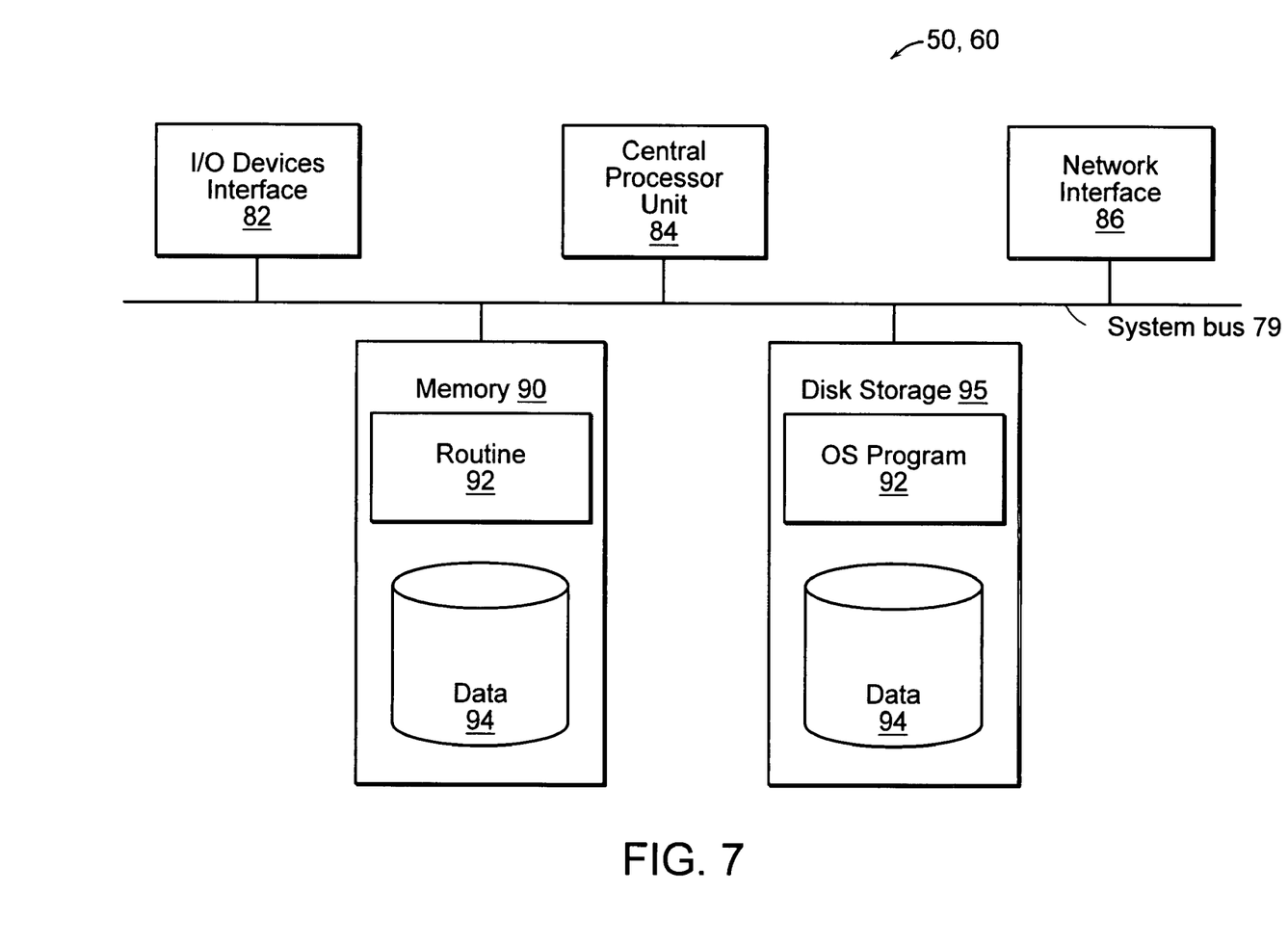
FIG. 7 is a block diagram of the internal structure of a computer from the FIG. 6 computer environment.

FIG. 7 is a diagram of the internal structure of a computer (e.g., client computer(s) 50 or server computers 60) in the computer system of FIG. 6. Each computer contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 6). Memory 90 provides volatile storage for computer software instructions used to implement an embodiment of the present invention (e.g., metadata of meta models and models of Program Routines 92 and Data 94). Disk storage 95 provides non-volatile storage for computer software instructions and data used to implement an embodiment of the present invention. Central processor unit 84 is also attached to system bus 79 and provides for the execution of computer instructions.

Figure 8:
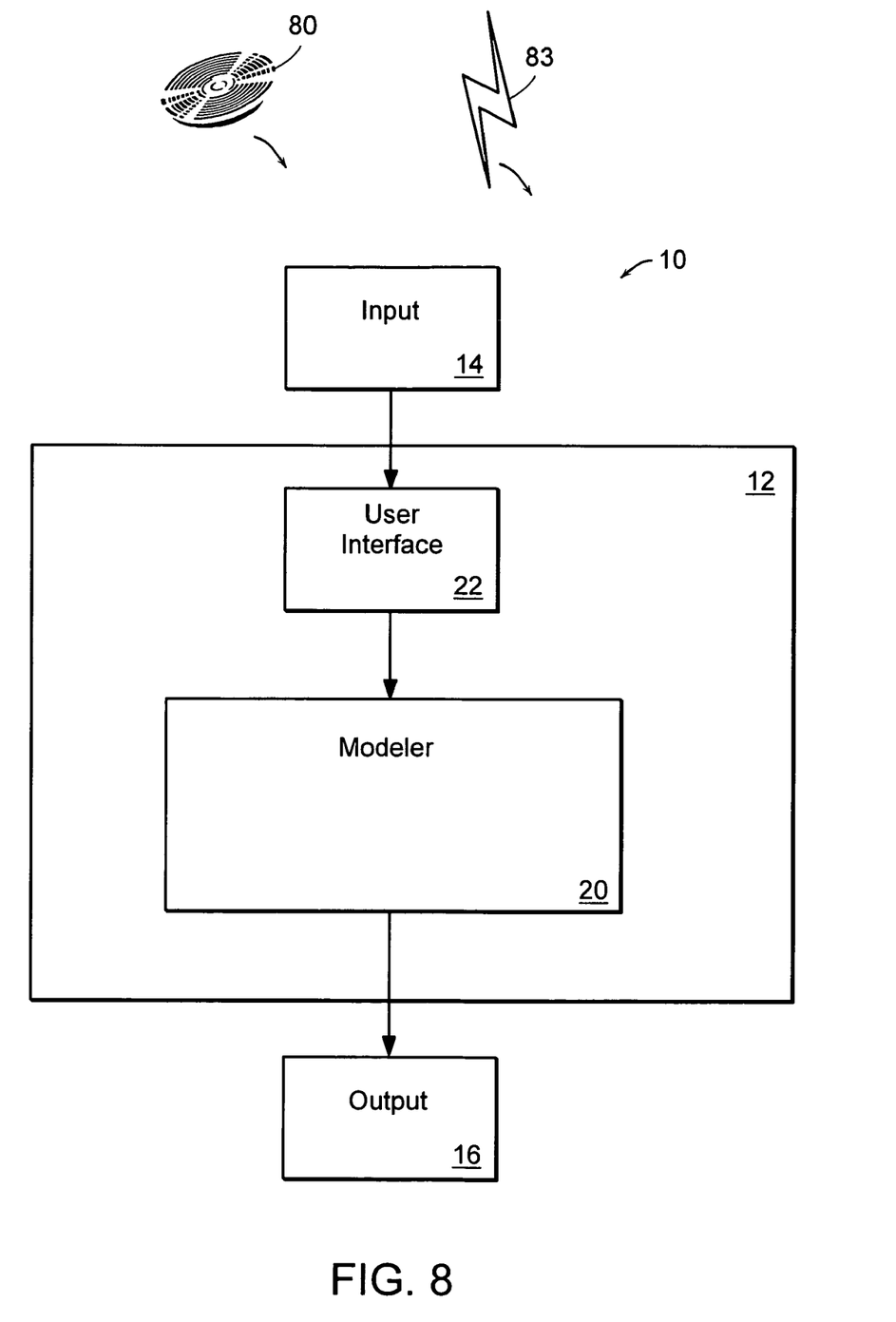
FIG. 8 is a schematic illustration of computer systems implementing methods of the present invention.

Referring now to FIG. 8 illustrated is another computer system 10 embodying the present invention techniques mentioned above. Generally, computer system 10 includes digital processor 12 in which subject modeling language and model metadata 20 are utilized. Input means 14 provides user commands, selections (generally communication) to computer system 10.

Responsive to input means 14 is user interface 22. User interface 22 receives user input data from input means 14 and provides input data for processing and manipulation at 20. The methods of the invention are implemented at 20 for designing software solutions, products and the like which are graphically visualized at output 16. Output 16 may be a display monitor, printer or other computer.

In one embodiment, computer program product 80, including a computer readable medium (e.g., a removable storage medium such as one or more DVD-ROM's, CD-ROM's, diskettes, tapes, etc.) provides at least a portion of the software instructions at 20 and/or user interface 22. Computer program product 80 can be installed by any suitable software installation procedure, as is well known in the art. In another embodiment, at least a portion of the software instructions may also be downloaded over a wireless connection. Computer program propagated signal product 83 embodied on a propagated signal on a propagation medium (e.g., a radio wave, an infrared wave, a laser wave, a sound wave, or an electrical wave propagated over a global network such as the Internet, or other network(s)) provides at least a portion of the software instructions at 20 and/or user interface 22.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 80 is a propagation medium that the computer system 10 may receive and read, such as by receiving the propagation medium and identifying a propagated signal embodied in the propagation medium, as described above for computer program propagated signal product 83.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer method of extending metaclasses in a metamodel, comprising the steps of:
   defining an extension of a metaclass in a metamodel, an instance of the metamodel being a user model having one or more model elements;

applying the defined extension to one of the model elements of the user model, wherein the model element maintains a list of annotations to track and manage applied stereotypes; and during run time, dynamically (i) creating a metamodel object representing the defined extension such that requirement for intermediate code generation to extend the metamodel is removed, and (ii) linking the created metamodel object to the model element, including adding the created metamodel object as an annotation in the model element's list of annotations replacing direct references to stereotypes extending the metamodel.

2. A method as claimed in claim 1 wherein the defined extension extends a subject metaclass of the model element; and the step of linking includes linking the created metamodel object to the subject metaclass.

3. A method as claimed in claim 1 wherein the step of creating a metamodel object includes employing dynamic Eclipse Modeling Framework.

4. A method as claimed in claim 1 further comprising the step of providing an interface to the metamodel to support the steps of defining, applying and runtime steps.

5. A method as claimed in claim 1 further comprising the step of annotating the model element with arbitrary references to other objects.

6. A method as claimed in claim 5 wherein the references include a reference to the created metamodel object and/or implied references to properties of the defined extension.

7. Computer apparatus for implementing modeling language profiles having a feature of extending metaclasses in a metamodel, comprising:

computer means in memory defining an extension of a metaclass in a metamodel, an instance of the metamodel being a user model having one or more model elements;

processor means in memory applying the defined extension to one of the model elements of the user model, wherein the model element maintains a list of annotations to track and manage applied stereotypes;

during processor execution, run time means dynamically creating a metamodel object representing the defined extension such that requirement for intermediate code generation to extend the metamodel is removed; and adding the created metamodel object as an annotation in the model element's list of annotations, the annotation serving as a link linking the created metamodel object to the model element and replacing direct references to stereotypes extending the metamodel.

8. Computer apparatus as claimed in claim 7 wherein the link is created during runtime.

9. Computer apparatus as claimed in claim 7 wherein the defined extension extends a subject metaclass of the model element;

the link provides a reference between the created metamodel object and the subject metaclass.

10. Computer apparatus as claimed in claim 7 wherein the runtime means employs dynamic Eclipse Modeling Framework.

11. Computer apparatus as claimed in claim 7 further comprising an interface to the metamodel enabling user access to the means for defining, means for applying, runtime means and link.

12. Computer apparatus as claimed in claim 7 further comprising annotations to the model element, said annotations having arbitrary references to other objects.

13. Computer apparatus as claimed in claim 12 wherein the references include a reference to the created metamodel object and/or implied references to properties of the defined extension.

* * * * *